United States Patent [19]
Tono et al.

[11] Patent Number: 5,304,889
[45] Date of Patent: Apr. 19, 1994

[54] COLOR CATHODE-RAY TUBE, AND SURFACE-TREATED PHOSPHOR AND METHOD FOR ITS PRODUCTION

[75] Inventors: Hideo Tono; Masaru Naito; Tomohiro Miyazaki, all of Odawara, Japan

[73] Assignee: Kasei Optonix Ltd., Tokyo, Japan

[21] Appl. No.: 701,028

[22] Filed: May 16, 1991

[30] Foreign Application Priority Data

May 18, 1990 [JP] Japan .................. 2-126816

[51] Int. Cl.⁵ .............................................. H01J 29/20
[52] U.S. Cl. ........................ 313/467; 313/486; 313/489
[58] Field of Search ................. 313/467, 486, 489; 428/403, 407, 701, 702

[56] References Cited

U.S. PATENT DOCUMENTS

| | | | |
|---|---|---|---|
| 4,797,594 | 1/1989 | Sigai et al. | 313/486 |
| 4,946,707 | 8/1990 | Kasenga et al. | 313/486 |
| 5,032,316 | 7/1991 | Takahashi et al. | |

FOREIGN PATENT DOCUMENTS

61-243884 10/1986 Japan.

OTHER PUBLICATIONS

World Patents Index Latest, 91-041133, & JP-A-2 308 892, Dec. 21, 1990, "Phosphor For Colour TV Cathode Ray Tube- Has Surface Coated With Silica, Zinc Silicate, Zinc (Hydr)Oxide".
Patent Abstracts of Japan, vol. 13, No. 151, Apr. 12, 1989, & JP-A-63 308 088, Dec. 15, 1988, M. Hideji, et al., "Fluorescent Material".

*Primary Examiner*—Donald J. Yusko
*Assistant Examiner*—Nimesh Patel
*Attorney, Agent, or Firm*—Oblon, Spivak, McClelland, Maier & Neustadt

[57] ABSTRACT

A color cathode-ray tube having a fluorescent screen of red-, blue- and green-emitting phosphors as image elements of a fluorescent layer, wherein at least one of said phosphors is coated with a double oxide of zinc and aluminum.

13 Claims, 1 Drawing Sheet

COLOR CATHODE-RAY TUBE, AND SURFACE-TREATED PHOSPHOR AND METHOD FOR ITS PRODUCTION

The present invention relates to a cathode-ray tube for color televisions, and a surface-treated phosphor suitable for the production thereof and a process for its production.

BACKGROUND OF THE INVENTION

A fluorescent screen for a cathode ray tube for televisions is usually prepared by a series of operations which comprises forming by a photo printing method three-color emitting phosphor picture elements R (red), G (green) and B (blue) on the inner surface of a face plate provided with a black matrix, subjecting the surface of the phosphor picture elements R, G and B thus formed to filming treatment, then vapor depositing aluminum to provide a metal back to increase the light-taking out effects of the fluorescent screen, and finally burning a filming material and an organic substance for photo curing such as polyvinyl alcohol remaining after the photo printing in the picture elements, by baking treatment.

However, in such a series of operations, if copper is included even in a very small amount at a part of the blue picture element, such a part undergoes a color change from the initial blue-emission to a green-emission, and green specks will be formed in the blue picture element, thus leading to a coloring defect of the blue picture element.

This color change of the blue picture element to green is believed to be caused in such a manner that the copper or its compound included in a very small amount undergoes ion diffusion due to the heat during the baking treatment, whereby the blue-emitting phosphor ZnS:Ag undergoes a compositional change to a green-emitting phosphor of ZnS:Cu or ZnS:Cu,Ag, which will form green specks.

Under the circumstances, causes for this copper contamination have been examined. It has been found that there are an external factor such that copper powder or a copper compound is included from outside during the process of forming the fluorescent screen and an internal factor such that, for example, a copper compound is contained in the phosphor itself during its recovery process. The color change of the fluorescent screen by such a copper contamination source is considered to be due to a chemical change during the filming treatment or during the mixing of a photosensitive slurry of the phosphor and due to the copper ion diffusion by heat during the baking treatment.

A method for preventing copper contamination by controlling the diffusion of copper ions during the filming treatment, is disclosed in Japanese Unexamined Patent Publication No. 243884/1986.

However, there has been no effective measure to prevent copper contamination due to the copper ion diffusion by heat during the baking treatment.

SUMMARY OF THE INVENTION

It is an object of the present invention to solve the above-mentioned problems and to provide a phosphor capable of preventing all copper contamination including contamination during the baking treatment and a method for its production.

The present invention provides a color cathode-ray tube having a fluorescent screen comprising red-, blue- and green-emitting phosphors as image elements of a fluorescent layer, wherein at least one of said phosphors is coated with a double oxide of zinc and aluminum.

The present invention also provides a surface-treated phosphor comprising phosphor particles having their surface coated with a double oxide of zinc and aluminum.

Further, the present invention provides a method for producing a surface-treated phosphor, which comprises adding an alkaline ionic zinc compound and a water-soluble aluminate to a phosphor suspension and depositing a substance containing zinc and aluminum on the surface of phosphor particles to form a coating layer.

DETAILED DESCRIPTION OF THE PREFERRED EMBODIMENTS

Figure 1:
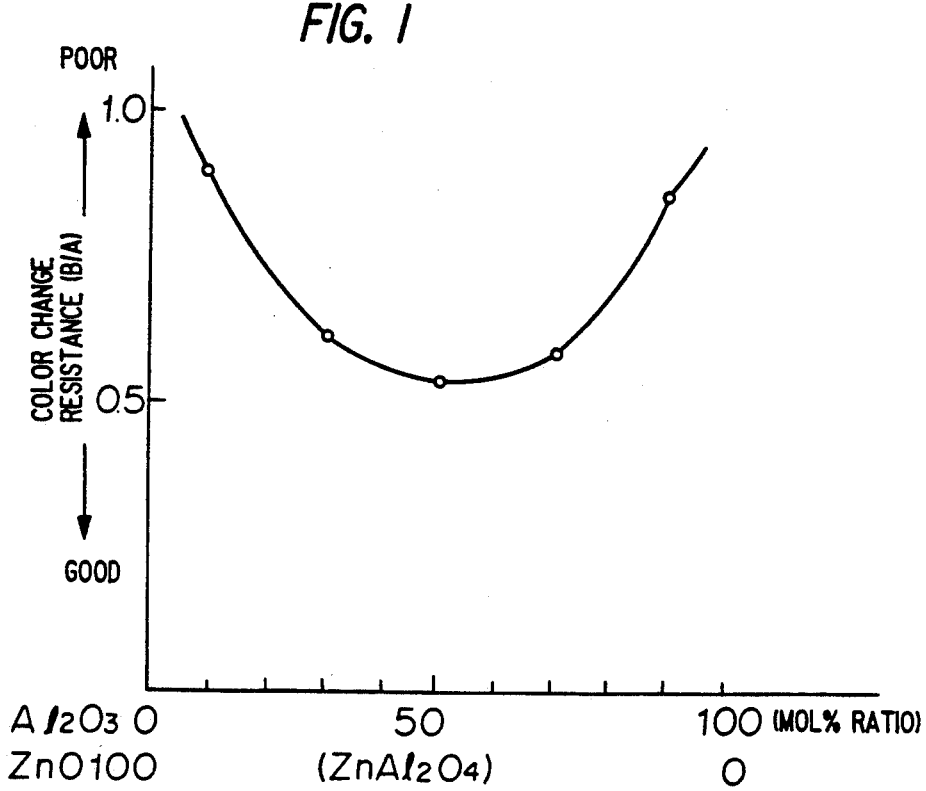
FIG. 1 is a graph showing the color change resistance when the compositional proportions of ZnO and $Al_2O_3$ in the double oxide formed on the surface of the phosphor particles are changed.

The double oxide useful in the present invention may typically be a double oxide of the formula $xZnO \cdot yAl_2O_3$ (wherein $x+y=1$ and $0.05 \leq x \leq 0.95$, the same applies hereinafter). Particularly preferred is zinc aluminate ($ZnAl_2O_4$), or the one wherein x and y are selected to be about the ratio of zinc aluminate. Further, it is preferred that the major portion, particularly at least 90%, of the surface of the phosphor particles is covered with the double oxide, so that the phosphor surface will not substantially be exposed. Further, it is preferred to coat the surface of the phosphor particles with not only the above double oxide but also a latex as the supporting agent. Here, the latex is preferably the one well known to be used for a phosphor, as disclosed in e.g. U.S. Pat. No. 4,049,845. Among various latexes, a rubber latex having elasticity is particularly preferred. The deposition of the above double oxide on the phosphor surface is preferably conducted in warm water of at least 35° C., preferably from 40 to 85° C.

The blue picture element has a problem that a copper component included by the above-mentioned external factor or internal factor, undergoes a reaction for substitution of an activator during the baking treatment to form a green-emitting phosphor, for example, as represented by the following formula, whereby green specks will be formed.

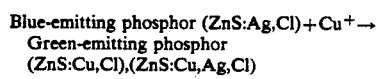
Blue-emitting phosphor (ZnS:Ag,Cl)+Cu⁺→
Green-emitting phosphor
(ZnS:Cu,Cl),(ZnS:Cu,Ag,Cl)

In order to solve the above problem, the present invention is designed to provide a barrier of uniform coating containing a double oxide of zinc and aluminum, if necessary, together with a latex, on the surface of the phosphor particles, to prevent the diffusion of copper ions during the baking treatment and thereby to prevent the formation of green specks in the blue picture element.

Namely, when the recovered red- or green-emitting phosphor itself has a copper component on its surface or in its composition, the barrier on the surface of the red- or green-emitting phosphor prevents the diffusion of the copper component to the adjacent blue picture element during the baking treatment. Further, the barrier on the surface of the blue-emitting phosphor prevents the diffusion and penetration of copper from phosphors of other colors and also prevents the diffusion and penetration into the blue-emitting phosphor of fine powder of copper or a copper compound during the preparation of the fluorescent screen, and thus it prevents the formation of green specks in the blue picture element. Thus, the phosphor to be coated with the double oxide is preferably a red-emitting or blue-emitting phosphor or a phosphor containing no copper as an activator.

The above barrier is a coating layer formed by adding an alkaline ionic zinc compound and a water-soluble aluminate in proper proportions to a phosphor suspension and depositing a double oxide of zinc and aluminum on the surface of the phosphor particles. The above alkaline ionic zinc compound may, for example, be the one obtained by mixing a water-soluble zinc compound such as zinc sulfate, zinc nitrate or zinc chloride and an alkali agent such as sodium hydroxide, potassium hydroxide or ammonium hydroxide in an aqueous solvent. The above water-soluble aluminate may, for example, be sodium aluminate, potassium aluminate or lithium aluminate.

Figure 2A:
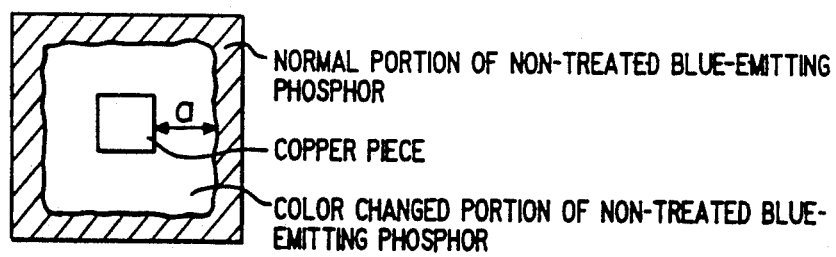
FIGS. 2(A) and (B) are drawings illustrating the method for measuring the color change resistance.
Figure 2B:
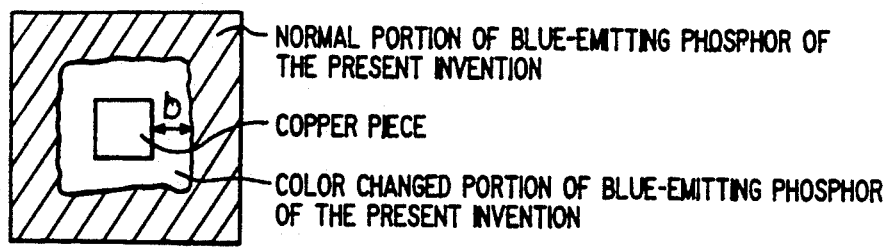

By changing the composition of this double oxide the ratio of x and y in the formula $xZnO \cdot yAl_2O_3$, the color change resistance was examined, whereby as shown in FIG. 1, it was found that $ZnAl_2O_4$ i.e. the equimolar ratio of zinc oxide and aluminum oxide was most effective. The color change resistance was determined in such a manner that a blue-emitting phosphor having a coating layer of the double oxide formed thereon and a non-treated blue-emitting phosphor were coated on square panels, respectively, and then subjected to exposure over the entire surface, development, drying and coating with a filming solution, followed by baking treatment at 430° C. for 30 minutes with copper pieces placed at the center portions of the respective panels, whereby the results as shown in FIGS. 2(B) and (A) were obtained, respectively. Here, the ratio of b/a was used as an index for the color change resistance, where b is the width of the color changed region of the panel on which the treated phosphor was coated and a is the width of the color changed region of the panel on which the nontreated phosphor was coated. The smaller the value b/a of the color change resistance, the smaller the color change of the present invention relative to the nontreated phosphor and the better the color change resistance.

The above $ZnAl_2O_4$ has a spinel structure and is chemically stable. This is believed to be the reason why the strong coating layer is formed. However, when the double oxide is represented by the compositional formula $xZnO \cdot yAl_2O_3$, it is evident that as shown in FIG. 1, a fairly good color change preventing effect can still be obtained at a mixing ratio of $x+y=1$ and $0.05 \leq x \leq 0.95$. Particularly preferred is within a range of from $0.25 \leq x \leq 0.75$.

In the present invention, a further compound such as aluminum hydroxide may be complexed to the above double oxide. Namely, excellent effects will also be obtained with a double oxide having a very small to small amount of aluminum hydroxide added to the above $xZnO \cdot yAl_2O_3$, as represented by a typical compositional formula $aZnO \cdot bAl_2O_3 \cdot cAl(OH)_3$ (wherein $a+b+c=1$, $0.05 \leq a \leq 0.95$ and $0 \leq c \leq 0.1$) which is obtained by partially forming aluminum hydroxide at the time of returning the pH to neutral after reacting ionic zinc and an aluminate under an alkaline condition during the process for forming the above double oxide.

Further, in the present invention, a part of zinc may be substituted by other alkaline earth metal elements. Excellent effects can be obtained particularly when a small amount of at least one of magnesium and barium is incorporated. Likewise, a part of aluminum may be substituted by other trivalent metal elements. Such elements include gallium, indium, scandium and yttrium.

The treatment of the present invention can, of course, be combined with well known surface treatment. Particularly when at least one surface treating substance selected from the group consisting of a silicon compound, an aluminum compound and a zinc compound is formed on the surface-treated product of the present invention, it is possible to form an excellent fluorescent screen. It is particularly advisable to form a particulate substance of silica by means of colloidal silica.

If the amount of the above double oxide coated on the phosphor surface is too small, the coating layer will be thin, and it will be difficult to secure the prescribed barrier effect. On the other hand, if the coating layer is too thick, there will be a drawback that the emission of the phosphor will decrease.

Further, it is possible to control formation of cracks in the coating layer during drying, by using natural or synthetic rubber latex excellent in the elasticity at the time of forming the coating layer of the above double oxide. As such a latex, a butadiene emulsion is preferred.

Now, the present invention will be described in further detail with reference to Examples. However, it should be understood that the present invention is by no means restricted to such specific Examples. Similar effects can be obtained with pigment-deposited phosphors which are practically used at present. However, in the following Examples, phosphors are those having no pigment deposited.

EXAMPLE 1

Into a 1 l beaker, 100 g of a silver-activated zinc sulfide phosphor (ZnS:Ag) and 400 ml of pure water were introduced and stirred to obtain a suspension. This suspension was heated to 65° C., and 4 ml of a 10% zinc nitrate $[Zn(NO_3)_2 \cdot 6H_2O]$ aqueous solution was added thereto. The mixture was thoroughly stirred, and 2.5 ml of a 10% sodium aluminate $[NaAlO_2]$ aqueous solution was gradually added thereto. The mixture was stirred for 60 minutes, then left to stand still, and thereafter washed once with water. Then, dilute hydrochloric acid was gradually added to adjust the pH to 7.5. Then, stirring was continued for 20 minutes, and the mixture was left to stand still for 10 minutes to let the phosphor sediment. The supernatant was removed by decantation, and the phosphor was washed twice with pure water. Then, the phosphor was subjected to filtration and dehydration, dried at 110° C. for 15 hours and sieved with a screen of 300 mesh.

The blue-emitting phosphor thus obtained and a non-treated blue-emitting phosphor having no barrier for the purpose of comparison, were examined for the color change resistance against copper contamination, whereby as shown in Table 1, it was evident that the coated phosphor of Example 1 was excellent in the color change resistance.

TABLE 1

| Samples | Color change width | Color change resistance (b/a) |
|---|---|---|
| Coated phosphor | 1.8 mm | 0.58 |
| Non-treated phosphor | 3.1 mm | 1 |

EXAMPLE 2

In Example 1, to the phosphor suspension after washing the sedimented phosphor twice with pure water, a SBR latex (styrene-butadiene type synthetic rubber emulsion) was added in an amount of 200 ppm to the weight of the phosphor, and the subsequent operation was conducted in the same manner as in Example 1 to obtain a double oxide-coated blue-emitting phosphor, and the color change resistance was examined, whereby as shown in Table 2, the coated phosphor of Example 2 was excellent in the color change resistance.

TABLE 2

| Samples | Color change width | Color change resistance (b/a) |
|---|---|---|
| Coated phosphor | 1.6 mm | 0.52 |
| Non-treated phosphor | 3.1 mm | 1 |

EXAMPLE 3

Into a 1 l beaker, 100 g of a silver-activated zinc sulfide phosphor (ZnS:Ag) and 400 ml of pure water were introduced and stirred to obtain a suspension. This suspension was heated to 65° C., and 400 ml of a 10% zinc nitrate [$Zn(NO_3)_2 \cdot 6H_2O$] aqueous solution was added thereto. The mixture was thoroughly stirred and then an aqueous NaOH solution was added to adjust the pH to a level of at least 11, and the mixture was thoroughly stirred. Then, 2.5 ml of a 10% sodium aluminate [$NaAlO_2$] aqueous solution was gradually added thereto, and the mixture was thoroughly stirred. Then, dilute nitric acid was gradually added to adjust the pH to 7.5. Thereafter, stirring was continued for 20 minutes, and the mixture was left to stand for 10 minutes to let the phosphor sediment. The supernatant was removed by decantation, and the phosphor was washed twice with pure water. The phosphor was subjected to filtration and dehydration, dried at 110° C. for 15 hours and then sieved with a screen of 300 mesh.

The blue-emitting phosphor thus obtained and a non-treated blue-emitting phosphor having no barrier for the purpose of comparison, were examined for the color change resistance against copper contamination, whereby as shown in Table 3, the coated phosphor of Example 3 was found to be excellent in the color change resistance.

TABLE 3

| Samples | Color change width | Color change resistance (b/a) |
|---|---|---|
| Coated phosphor | 1.9 mm | 0.61 |
| Non-treated phosphor | 3.1 mm | 1 |

EXAMPLE 4

Into a 1 l beaker, a silver-activated zinc sulfide phosphor (ZnS:Ag) and 400 ml of pure water were introduced and stirred to obtain a suspension. A solution obtained by preliminarily dissolving zinc oxide in aqueous ammonia was added to the above phosphor suspension in an amount of 0.1% by weight as ZnO relative to the weight of the phosphor, and the mixture was stirred. Then, 2.5 ml of a 10% potassium aluminate [$KaAlO_2$] aqueous solution was gradually added, and the mixture was thoroughly stirred. Then, dilute nitric acid was gradually added to adjust the pH to 7.5. Then, stirring was continued for 20 minutes, and the mixture was left to stand for 10 minutes to let the phosphor sediment. The supernatant was removed by decantation, and the phosphor was washed twice with pure water. The phosphor was subjected to filtration and dehydration, dried at 110° C. for 15 hours and sieved with a screen of 300 mesh.

The blue-emitting phosphor thus obtained and a non-treated blue-emitting phosphor having no barrier for the purpose of comparison, were examined for the color change resistance against copper contamination, whereby as shown in Table 4, the coated phosphor of this Example was found to be excellent in the color change resistance.

TABLE 4

| Samples | Color change width | Color change resistance (b/a) |
|---|---|---|
| Coated phosphor | 1.8 mm | 0.58 |
| Non-treated phosphor | 3.1 mm | 1 |

EXAMPLE 5

Into a 1 l beaker, 100 g of a red-emitting phosphor ($Y_2O_2S$:Eu) containing copper, recovered from a waste liquid after development and treated for regeneration and 400 ml of pure water were introduced and stirred to obtain a suspension. This suspension was heated to 65° C., and 2.3 ml of a 10% sodium aluminate [$NaAlO_2$] aqueous solution was added thereto. The mixture was thoroughly stirred, and 6 ml of a 10% zinc nitrate [$Zn(NO_3)_2 \cdot 6H_2O$] aqueous solution was gradually added thereto, and then dilute nitric acid was gradually added to adjust the pH to 7.5. Here, the ratio of Zn to Al was 1.5:2, i.e. zinc is excess as compared with the ratio of zinc aluminate $ZnAl_2O_3$ of 1:2. Then, stirring was continued for 20 minutes, and the mixture was left to stand still for 10 minutes to let the phosphor sediment. The supernatant was removed by decantation and washed twice with pure water. Then, the phosphor was subjected to filtration and dehydration, dried at 110° C. for 15 hours and then subjected to heat treatment at 300° C. to increase the crystallinity of the coated substance.

The degree of the influence of the red-emitting regenerated phosphor thus obtained over the color change of the blue-emitting phosphor, was examined by the following method. Namely, on two panels, the above coated red emitting phosphor and a non-treated redemitting phosphor were coated, respectively, and then subjected to exposure over the entire surface, and a blue-emitting phosphor was coated thereon and subjected to exposure over the entire surface, followed by baking treatment at 430° C. for 30 minutes. By the baking treatment, copper diffused from the copper contamination source contained in the red-emitting phosphor in the lower layer to the upper layer of blue-emitting phosphor coating, whereby the number of green-emitting color change specks was counted. As shown in Table 5, the red-emitting regenerated phosphor of Example 5 has a small number of color change specks, thus indicating the barrier effects.

TABLE 5

| Samples | Number of color change specks |
| --- | --- |
| Coated phosphor | 2 |
| Non-treated phosphor | 6 |

According to the present invention, by adopting the above construction, the coating layer of the double oxide of ZnO and $Al_2O_3$ is capable of suppressing the diffusion of copper to the blue-emitting phosphor, whereby it is possible to substantially reduce the color change trouble which frequently occurred in the blue picture element during the conventional process for the production of cathode-ray tubes.

What is claimed is:

1. In a color cathode-ray tube having a fluorescent screen comprising red-, blue- and green-emitting phosphors as image elements of a fluorescent layer, the improvement wherein at least one of said phosphors is coated with a double oxide of zinc and aluminum.

2. The color cathode-ray tube according to claim 1, wherein at least one of the red- and blue-emitting phosphors is coated with said double oxide.

3. The color cathode-ray tube according to claim 1, wherein the phosphors contain no copper as an activator.

4. The color cathode-ray tube according to claim 1, wherein said double oxide is a double oxide of the formula $xZnO \cdot yAl_2O_3$ wherein $x+y=1$ and $0.05 \leq x \leq 0.95$.

5. The color cathode-ray tube according to claim 1, wherein said double oxide contains a small amount of magnesium, barium, gallium, indium, scandium, yttrium and/or aluminum hydroxide.

6. The color cathode-ray tube according to claim 4, wherein x is within a range of $0.25 \leq x > 0.75$.

7. The color cathode-ray tube according to claim 1, wherein said at least one of the phosphors is coated with said double oxide and a latex.

8. A surface-treated phosphor comprising phosphor particles having their surface coated with a double oxide of zinc and aluminum.

9. The surface-treated phosphor according to claim 8, wherein said double oxide is a double oxide of the formula $xZnO \cdot yAl_2O_3$ wherein $x+y=1$ and $0.05 \leq x \leq 0.95$.

10. The surface-treated phosphor according to claim 9, wherein x is within a range of $0.25 \leq x \leq 0.75$.

11. The surface-treated phosphor according to claim 8, wherein said double oxide is zinc aluminate.

12. The surface-treated phosphor according to claim 8, wherein the surface of the phosphor particles is coated with said double oxide and a latex.

13. The surface-treated phosphor according to claim 12, wherein said latex is a rubber latex.

* * * * *